United States Patent [19]
Toshima

[11] Patent Number: 4,748,354
[45] Date of Patent: May 31, 1988

[54] ROTOR FOR SALIENT-POLE MACHINE

[75] Inventor: Hisashi Toshima, Hitachi, Japan

[73] Assignee: Hitachi, Ltd., Tokyo, Japan

[21] Appl. No.: 106,008

[22] Filed: Oct. 7, 1987

Related U.S. Application Data

[63] Continuation of Ser. No. 829,025, Feb. 13, 1986, abandoned.

[30] Foreign Application Priority Data

Feb. 15, 1985 [JP] Japan .................. 60-26274

[51] Int. Cl.$^4$ .............................................. H02K 9/00
[52] U.S. Cl. .................... 310/60 A; 310/61; 310/269
[58] Field of Search ..................... 310/59, 60 A, 60 R, 310/61, 194, 269, 218, 64

[56] References Cited

U.S. PATENT DOCUMENTS 2,974,239 3/1961 Havelka ................................ 310/61
3,514,647 5/1970 Lipstein ............................ 310/60 R
4,496,863 1/1985 Sawatani ................................ 310/61

FOREIGN PATENT DOCUMENTS 203503 4/1966 Sweden .

Primary Examiner—Donovan F. Duggan
Attorney, Agent, or Firm—Antonelli, Terry & Wands

[57] ABSTRACT

A rotor for a salient-pole machine comprises a rotor rim rotatable with a rotary shaft and magnetic poles fixedly connected at prescribed intervals to the rotor rim on its outer periphery. Axially extending ventilation grooves are formed on the rotor rim between respective adjacent poles. The pole is connected to the rotor rim by means of a dovetail joint consisted of a dovetail groove on the rotor rim and a dovetail tenon on the bottom of the pole. The ventilation groove has a sectional profile in the perpendicular to the rotary shaft which is defined by connecting necessary lengths required in the material strength of groups of lines respectively originating from the corners of the dovetail groove.

2 Claims, 3 Drawing Sheets

ROTOR FOR SALIENT-POLE MACHINE

This application is a continuation of application Ser. No. 829,025, filed Feb. 13, 1986, now abandoned.

BACKGROUND OF THE INVENTION

The present invention relates to a rotor for a salient-pole machine and, more particularly, to an improvement in ventilation grooves provided on an outer periphery of a rotor rim for cooling magnetic poles.

FIGS. 5 and 6 show a portion of a conventionally employed structure of a rotor of the above-mentioned type. As shown in FIG. 5, a rotary shaft 1 has a spider 2 mounted thereto, with a rotor rim fixed on the outer periphery thereof. The rotor rim 3 is formed on its outer periphery with a plurality of dovetail grooves 5, each of which has a magnetic pole 4 rigidly secured therein. Previously, the rotor of this type only a narrow space between respective adjacent poles, is typically provided on an outer peripheral portion of the rotor rim, between respective adjacent poles, with an U shaped ventilation groove 7, such as disclosed, for example, in Japanese Utility Model Examined Publication No. 40-5927, for the purpose of maintaining a ventilation space to provide for an improved cooling effect.

More specifically, in FIGS. 5 and 6, if it is desired to have cooling air effectively come into contact with coils 6 of the magnetic poles 4 in order to adequately cool the coils 6, the cooling air has to be spread over the whole length of each pole 4 in the axial direction before flowing into the coils 6. For this purpose, the rotor rim 3 has been provided on its outer periphery with the U shaped ventilation grooves 7 through which the cooling air, as shown by arrows E and F, can be distributed over the whole axial length of each magnetic pole 4 and then caused to radially flow toward and effectively cool the coils 6.

Further, since each pole 4, when rotated, undergoes centrifugal force, shown by arrows P, a dovetail joint has been adopted for connecting the pole 4 to the rotor rim 3, that is, the pole 4 is arranged to be capable of staying at its prescribed location against centrifugal force P by the dovetail joint portion. Components Q of centrifugal force P act on the dovetail joint.

In such a prior art construction, between the dovetail groove 5 and the U shaped ventilation groove 7, the portion between points A and B or C and D necessarily becomes susceptible to breakage when considered from the standpoint of strength. Due to the component Q of centrifugal force P acting upon the pole 4, shearing stress results in the portion A-B or C-D due to the component Q and the bending stress due to a bending moment Q×l and the portion is required to endure such resultant stress, but some of the existing machines have shortcomings that if said portion is designed to have a dimension required from a viewpoint of strength, it becomes impossible to provide an effective ventilation groove.

SUMMARY OF THE INVENTION

Considering the above-mentioned shortcomings, the present invention aims to provide a rotor for a salient-pole machine wherein a sufficient amount of cooling air is allowed to flow in and no excessive stress is permitted to generate in a rotor rim.

To this end, according to the invention, there is provided a ventilation groove having a sectional profile in perpendicular to a rotary shaft and defined by connecting necessary lengths required in the material strength of groups of lines respectively originating from corners of a dovetail groove.

DETAILED DESCRIPTION

In the following, several embodiments of the present invention will be fully explained by way of example, with reference to FIGS. 1 through 4.

Figure 1:
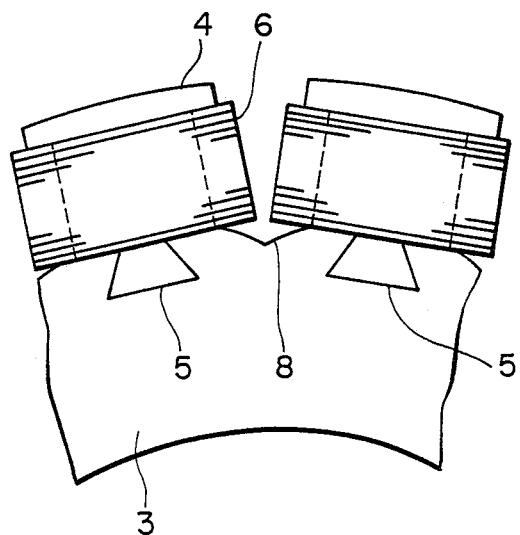
FIG. 1 is a plan view of a portion of an embodiment of a rotor according to the present invention.
Figure 6:
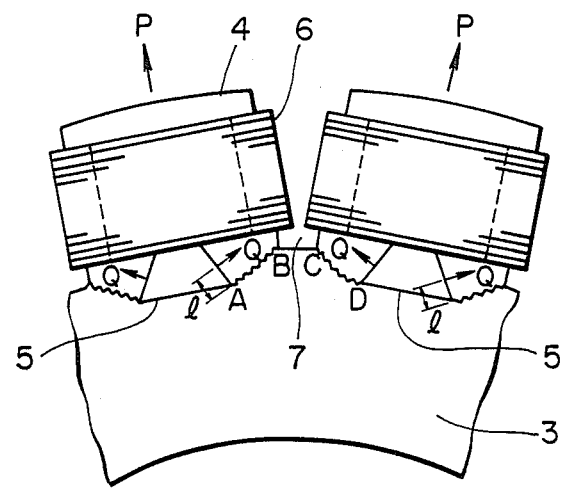
FIG. 6 is a plan view taken in a direction of the arrows I—I in FIG. 5.

FIG. 1 is a plan view showing an invention construction corresponding to a conventional construction illustrated in FIG. 6. As shown in FIG. 1, a magnetic pole 4 is rigidly anchored to each dovetail groove 5 on a rotor rim 3 and there is provided between adjacent grooves 4 a ventilation groove 8 having a sectional profile defined by connecting necessary lengths required in the material strength of groups of lines respectively originating from the corners of the dovetail grooves 5 and having a general V-shape. Cooling air, therefore, can be guided through the grooves and distributed over the whole axial length of the magnetic pole 4 and then caused to flow in the radial direction to cool coils 6.

Figure 3:
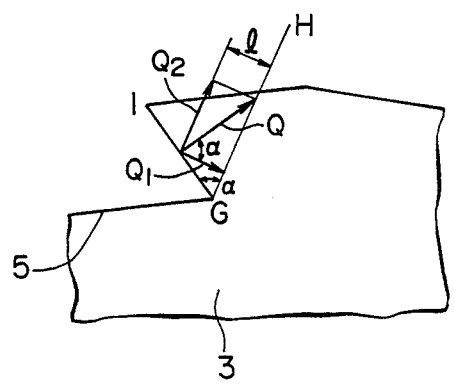
FIG. 3 is a view illustrating forces acting upon a dovetail groove portion of the rotor shown in FIG. 2.

In FIG. 3, when Q indicates a component of centrifugal force P perpendicular to a dovetail groove surface I-G, forces $Q_1$ and $Q_2$ respectively acting perpendicularly and in parallel to a plane defined by a plane making an angle $\alpha$ to the dovetail groove surface, that is, a segment G-H and the length Z of the pole 4 in the direction of its rotary shaft are respectively expressed as follows:

$Q_1 = Q \cos \alpha$
$Q_2 = Q \sin \alpha$ and stresses produced by these forces are expressed by the following formulas:

$$\text{compressive stress; } \sigma_c = \frac{Q_1}{GH \times Z}$$

$$\text{shearing stress; } \tau = \frac{Q_2}{GH \times Z}$$

$$\text{bending stress; } \sigma_b = \frac{6 \times Q_2 \times l}{GH^2 \times Z}, \text{ hence}$$

$$\text{resultant stress; } \sigma = \sqrt{(\sigma_c + \sigma_b)^2 + 3\tau^2}$$

By making the resultant stress $\sigma$ equal to an allowable stress which is determined by material strength of the rotor rim 3, the length L of the segment G-H required at a specified angle $\alpha$ can be determined. Then the angle $\alpha$ is changed and the length required at the changed angle is determined. By repeating this operation to determine the lengths L required at respective angles and finally connecting terminal points of these required lengths, a sectional profile can be determined (FIG. 2) which may be considered as generally V-shaped.

Thus, the area of the ventilation groove 8 shown in FIG. 1 becomes the largest in the spaces which can be selected by considering the allowable stress and the area necessarily becomes larger than that obtainable in the U shaped or other configured ventilation grooves of conventional construction, so that the ventilation capacity of the ventilation groove 8 is also rendered the largest and the cooling effect of the groove 8 becomes the largest as well.

Figure 2:
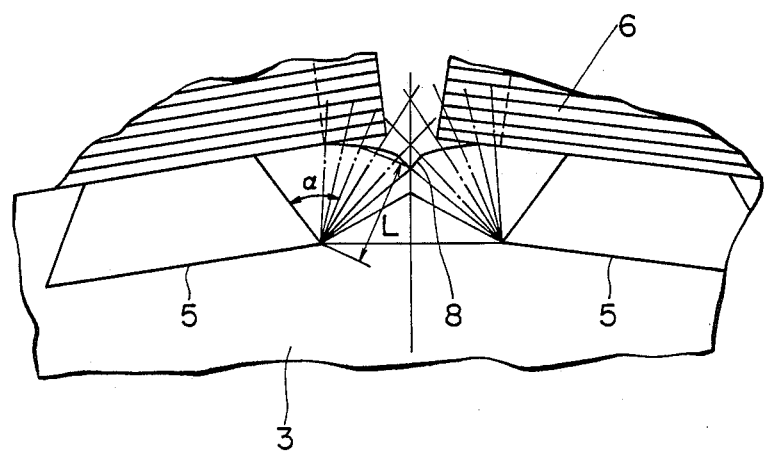
FIG. 2 is an enlarged view of a ventilation groove portion of the rotor shown in FIG. 1.
Figure 4:
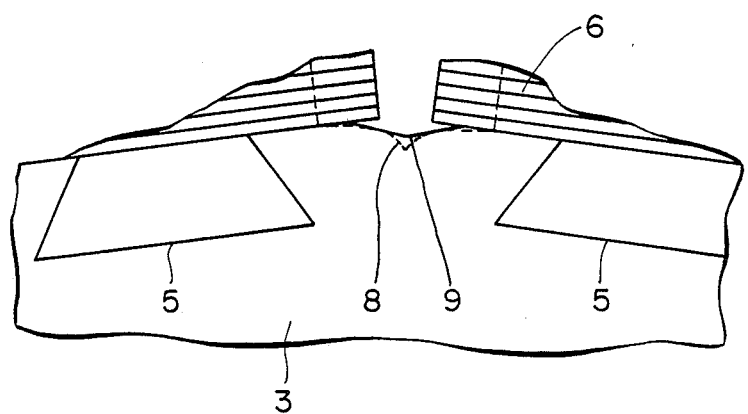
FIG. 4 is a plan view of a portion of another embodiment of a rotor according to the present invention.
Figure 5:
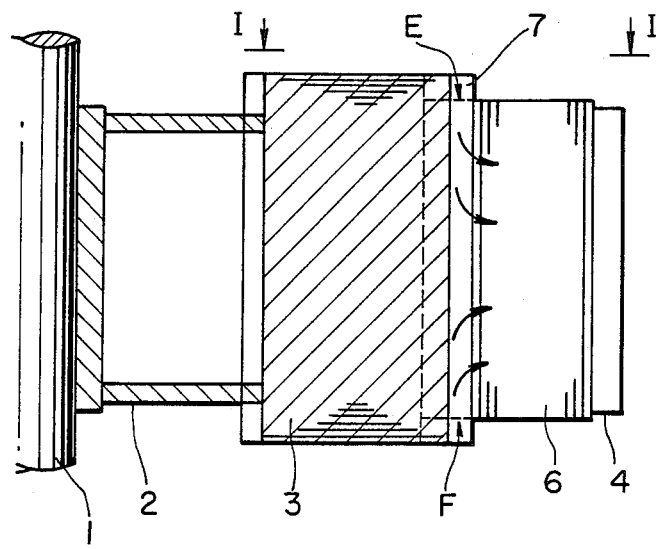
FIG. 5 is a sectional view showing a construction of a conventional rotor.

Referring to FIG. 4, there is shown a modified embodiment of the invention wherein a ventilation groove 9 is defined by the combination of straight lines very similar to the lines shown in FIG. 2. This ventilation groove 9 is machinable with ease and its cooling effect is considered nearly identical to that of the ventilation groove 8.

As has noted above, according to the present invention, it is possible to give the largest possible area to each ventilation groove formed between adjacent magnetic poles on the outer periphery of a rotor rim, so that it is possible to enhance the cooling effect exerted by cooling air onto coils of magnetic poles, which can not only make an extremely great contribution toward the improvement in electric machine performance, but also eliminate a structural fault that excessive stress can occur in the rotor rim as is experienced in the conventional ventilation groove of U shape or other configurations.

What is claimed is:

1. A rotor for a salient-pole machine, the rotor comprising a rotor rim rotatable with a rotary shaft and magnetic poles fixedly connected to an outer periphery of the rotor rim at predetermined intervals, the rotor rim comprising a material having an allowable stress value, ventilation grooves formed on an outer peripheral surface of the rotor rim, said ventilation grooves extending in an axial direction of the rotary shaft and being disposed between respective adjacent magnetic poles dovetail joint means for connecting said rotor rim and said magnetic poles to each other, said dovetail joint means comprising dovetail grooves provided on the rotor rim and dovetail tenons provided on a bottom portion of the magnetic poles, and wherein each of said ventilation gooves has a cross-sectional profile, as viewed in a direction perpendicular to the rotary shaft, said cross-sectional profile being defined by connecting terminal points of two groups of lines originating respectively from respective adjacent corners of two adjacent dovetail groups at different angles, the length of each line from the origination at a corner of the dovetail groove to the terminal point thereof being determined in accordance with an angle of extension from the corner of the dovetail groove and the allowable stress value of the material of the rotor rim.

2. A rotor according to claim 1, wherein each ventilation groove has a substantially V-shape cross-sectional profile as viewed in the direction perpendicular to the rotary shaft.

* * * * *